March 21, 1961　　HARDY IWAO TSUNO　　2,975,695
AUTOMATIC FILM DEVELOPING MECHANISM
Filed Dec. 28, 1959　　　　　　　　　　　　　　　4 Sheets-Sheet 1

HARDY I. TSUNO,
INVENTOR.

BY William C. Babcock
ATTORNEY.

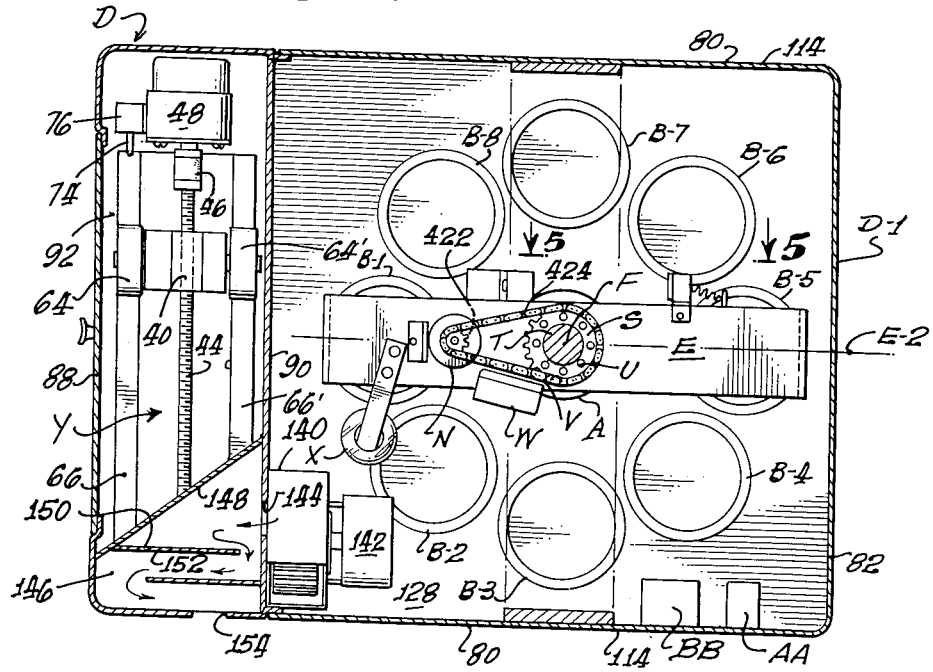
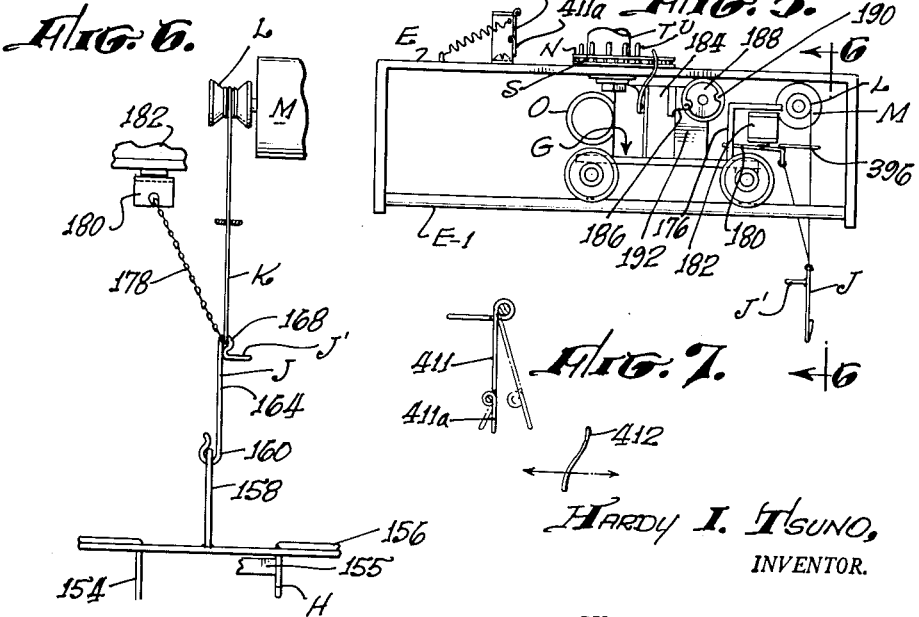

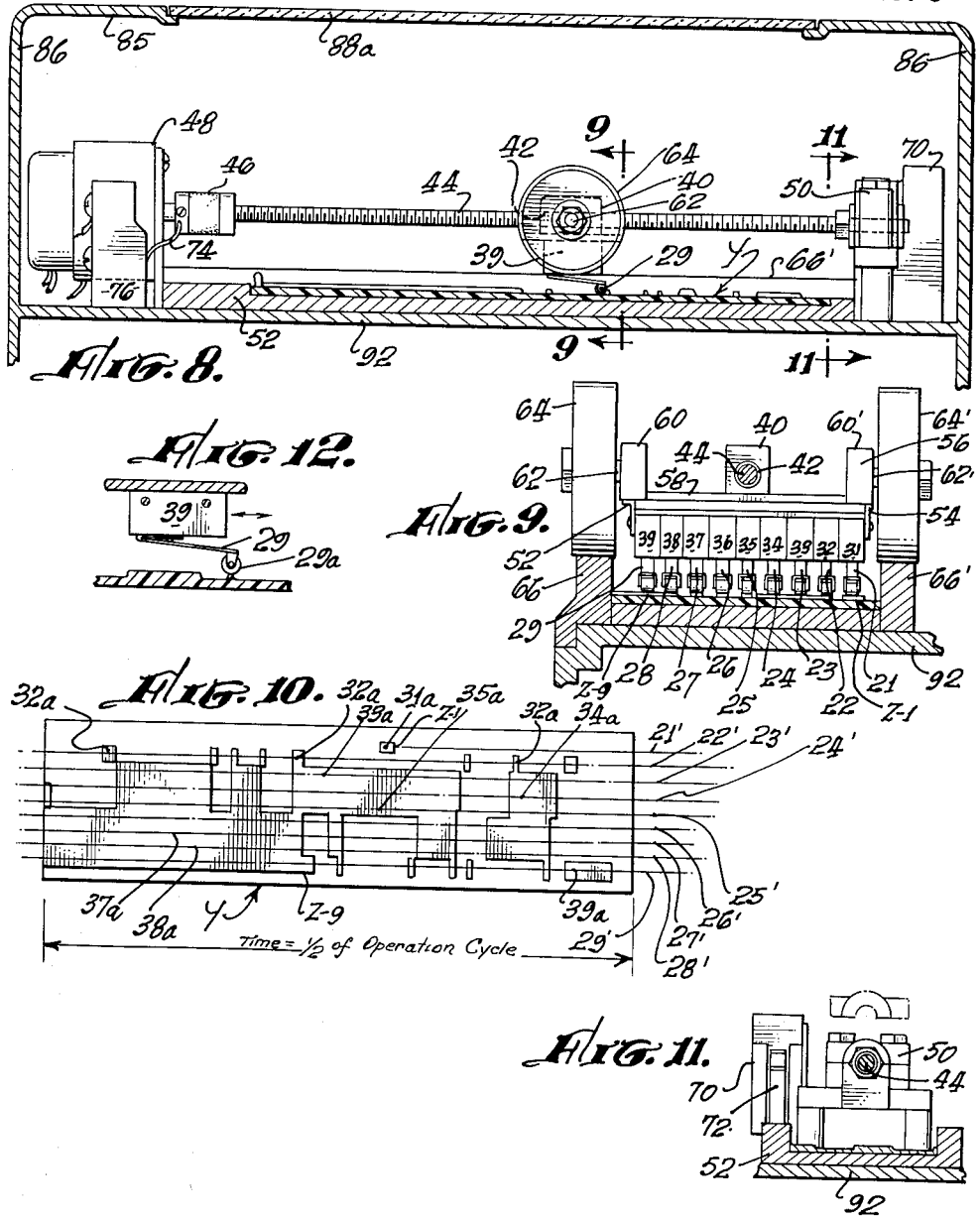

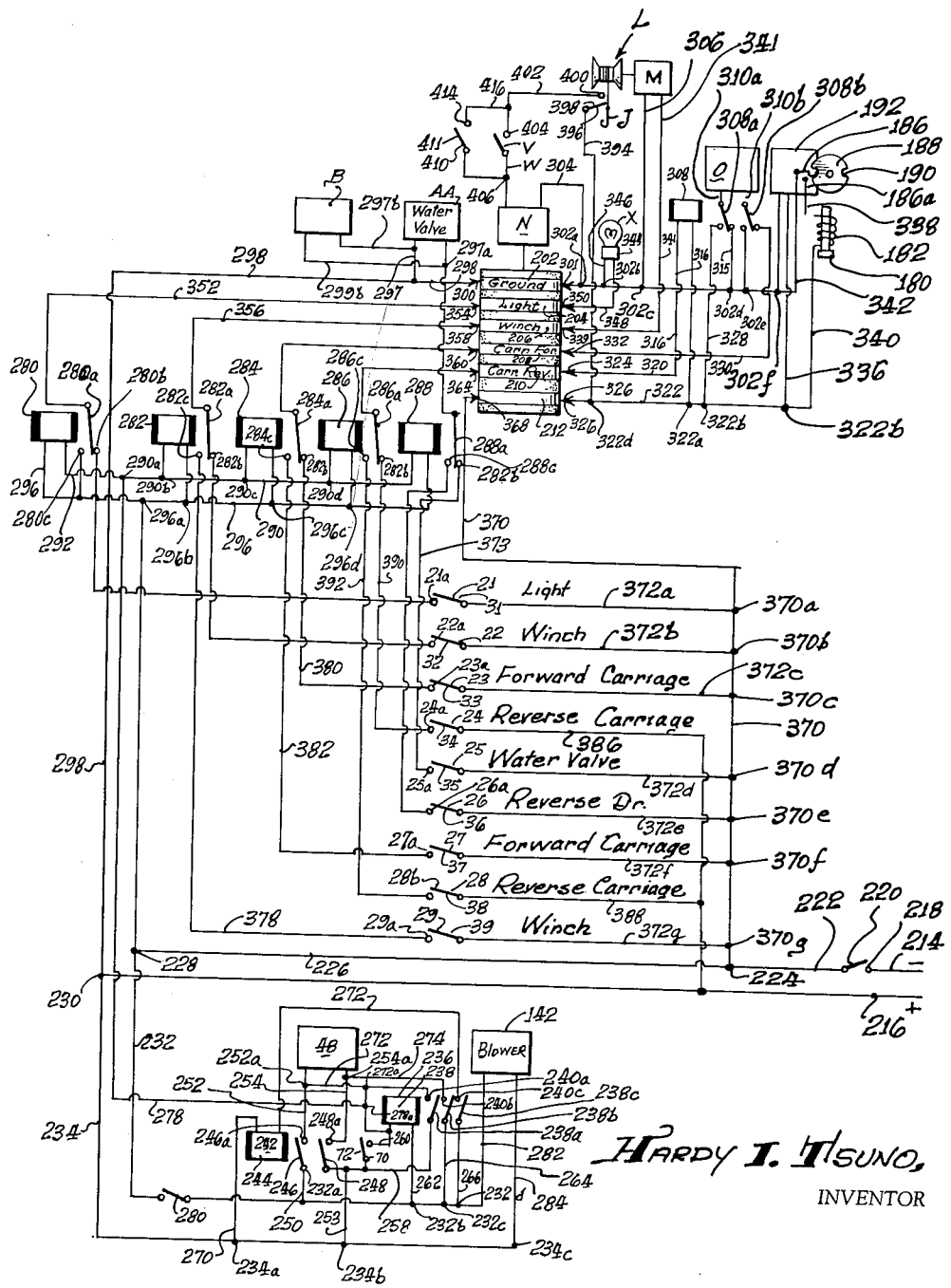

United States Patent Office 2,975,695
Patented Mar. 21, 1961

2,975,695
AUTOMATIC FILM DEVELOPING MECHANISM
Hardy Iwao Tsuno, 1240 W. 164th St., Gardena, Calif.
Filed Dec. 28, 1959, Ser. No. 862,113
19 Claims. (Cl. 95—89)

The present invention relates generally to the field of development of photographic film, and more particularly to an apparatus and method for automatically processing color film.

During the past few years the use of color film has becoming increasingly popular, and many amateur photographers, as well as professionals, are now using color film to obtain pictures that have far more general interest and appeal than the conventional black and white photographs. Since the initial introduction of color film, great strides have been made by the film manufacturers in the production of color film which, when properly exposed and developed, provides color photographs that are amazingly close reproductions of the subject matter thereof. Also, during this period cameras have been evolved and made commercially available that incorporate improved lens systems particularly well adapted for use of color film to the best advantage.

However, both the amateur and professional photographer having a limited amount of color film to be developed have heretofore been dependent on commercial processors of color film for the development thereof. Commercial film processors have expensive equipment which is adapted to handle color film in volume, but all of the color film of the same type is given the same development treatment, irrespective of the light conditions under which the photographs were taken. Obviously, such development or processing of color film is not satisfactory to an advanced amateur or professional photographer, and a very real demand has been created for a color processing device that is sufficiently versatile in operation that it can be employed to develop any of the commercially available color film. It is also desirable that such a device be susceptible of adjustment to a particular time cycle of processing recommended by the manufacturer of the film or one selected by the photographer.

A major object of the present invention is to provide a color film processing unit that will automatically subject the exposed film to a particular time cycle in a number of different developing solutions, as well as washing the film for desired periods of time in water between such immersions, with the unit being sufficiently compact and lightweight that it may be easily carried in an automobile to be available for film processing when required.

Another object of the invention is to supply a color film processing unit and method of using the same which is sufficiently simple structurally that little or no previous experience in the development of color film is necessary in the use thereof, and the unit may be made sufficiently compact as to be usable on a kitchen sink or table in the home and stored in a small closet when not in use.

A still further object of the invention is to furnish a color film processing unit which can be fabricated from standard commercialy available material, requires a minimum of maintenance attention, and can be sold at a sufficiently low price as to encourage its widespread use.

These and other objects and advantages of the present invention will become apparent from the following description of a preferred form thereof and from the accompanying drawings illustrating the same in which:

Figure 1 is a perspective view of the color film developing mechanism of the present invention;
Figure 2 is a vertical cross sectional view of the device taken on line 2—2 of Figure 1;
Figure 3 is a fragmentary horizontal cross-sectional view of the device taken on line 3—3 of Figure 2;
Figure 4 is another horizontal cross-sectional view of the invention taken along line 4—4 of Figure 2;
Figure 5 is an enlarged side elevational view of the rotatable platform, showing a set of horizontal rails supported thereon upon which a carriage may move longitudinally;
Figure 6 is a combined vertical cross-sectional and end elevational view of the platform showing a vertically movable spool on which film to be developed is mounted and taken on line 6—6 of Figure 5;
Figure 7 is a side elevational view of an electric switch that controls indexing of a rotatable platform;
Figure 8 is a side elevational view of the time cycle control mechanism;
Figure 9 is a vertical cross-sectional view of the control mechanism shown in Figure 8 taken on line 9—9 thereof;
Figure 10 is a plan view of a typical cam strip used in conjunction with the control system shown in Figures 8 and 9;
Figure 11 is a vertical cross-sectional view of the control mechanism shown in Figure 8 taken on line 11—11 thereof;
Figure 12 is a fragmentary side elevational view of one of the cam-actuated electrical switches shown in Figure 8; and
Figure 13 is a diagrammatic layout of the electrical system used in the invention.

Referring now to the drawings for the general arrangement of the invention, it will be seen to include an open-mouthed receptacle A in which the film being developed is rinsed in water. Eight open-mouthed receptacles B-1 to B-8 inclusive are circumfrenetially spaced about receptacle A. Each of the receptacles B-1 to B-8 contains a different liquid that is used in the processing of a particular type or brand of color film. Receptacles A and B-1 to B-8 inclusive are supported and held in a fixed position relative to a horizontally extending base C by means which will later be described. A light-tight housing D extends upwardly from base C to enclose the receptacles, as best seen in Figures 1 and 2.

A platform E (Figures 2 and 4) is disposed a substantial distance above receptacles A and B-1 to B-8 within the confines of housing D. Platform E is adapted to rotate in a horizontal plane about a vertical axis F on which receptacle A is centered. Platform E is elongate in shape and supports two parallel, laterally spaced rails E-1 therebelow on which a carriage G is mounted.

The carriage G is adapted to move longitudinally on rails E-1. A film holder H, preferably in the form of a spool, as shown in Figures 3 and 6, is removably supported from a hook J. Hook J in turn is supported from the lower end of a chain or other flexible member that may be wound or unwound from a spool L that is power driven by a motor M. Motor M, as can be seen in Figure 2 is supported on carriage G.

The platform E is capable of being rotated by a drive mechanism N (Figures 2 and 4) and indexed to any one of a sequence of positions where the longitudinally extending center line E-2 thereof is in vertical alignment with the center of receptacle A and the center of one of the receptacles B-1 to B-8 inclusive. Carriage G includes a reversible electric motor O, which when energized, causes the carriage to move into a position on rails E-1 where the film holder H is so centered relative to one of the receptacles B-1 to B-8 inclusive that the spool may be lowered into the liquid contained therein without the spool or film wound thereon touching the interior surface of the receptacle. Likewise, when the carriage G is in this position, the film holder H can be lifted upwardly out of the receptacle without touching the interior surface thereof. Upon electrical energization of motor O carriage G can also be moved into a position where the film holder H can be lowered into the receptacle A or lifted upwardly therefrom without contacting the interior surface of the receptacle. The electrical current that energizes motor O is broken when the carriage G reaches the position shown in Figure 2 where the holder H may be lowered downwardly or moved upwardly from one of the receptacles B-1 to B-8 by means that will hereinafter be described in detail. Likewise, when the carriage reaches a position where the film holder H can be lowered into or moved out of the receptacle A without contacting the interior surface thereof, the current to motor O is automatically broken by means to be later described.

The motor N shown in Figure 4 is, when electrically energized, capable of driving a sprocket S that is rigidly affixed to a vertical shaft T that extends downwardly to rigidly support the platform E therefrom. A number of circumferentially spaced pins U project upwardly from sprockets S. Each pin U is so disposed relative to an actuating lever V on an electrical switch W that when the platform E is moved to an indexed position relative to one of the receptacles B-1 to B-8, the lever V is moved to the open position to break the electrical circuit to motor N.

The interior of housing D can be illuminated when required by an incandescent bulb X, best seen in Figures 2 and 4. A number of cam strips Y are provided, each of which is adapted to be used in the processing of a different brand or type of color film (not shown). Each brand or type of color film requires different periods of time of immersion in a sequence of chemical solutions that are contained in receptacles B-1 to B-8, as well as different periods of exposure in rinse water contained in receptacle A between these periods of immersion.

Each cam strip Y, a typical example of which is shown in Figures 9 and 10, automatically controls the lighting of bulb X, the raising the lowering of the film holder H out of and into the receptacles A and B-1 to B-8, the backward and forward movement of carriage G on rails E-1, and the turning on and off of the flow of rinse water to receptacle A. Each cam strip Y has a number of cam faces formed thereon, and in the present illustration, longitudinally extending sections Z-1 to Z-9 inclusive project upwardly therefrom, which cam faces when contacted by the actuating arms 21 to 29 of normally open electrical switches 31 to 39 respectively, close electrical circuits to cause particular portions of the invention to be electrically energized.

Switches 31 to 39 are transversely arranged, as may be seen in Figure 9, and supported in fixed position relative to a rigid body 40 having a tapped bore 42 extending longitudinally therethrough. Bore 42 engages an externally threaded shaft 44 that is horizontally disposed above cam strip Y (Figures 8 and 9). A first end portion of shaft 42 is connected to a coupling 46 that is rotated at a constant speed by a reversible electrical motor 48. A second end portion of the shaft 44 is rotatably supported in a journal box 50. An elongate rigid support 52 is provided that is adapted to removably support cam strip Y on the upper surface thereof. Support 52 extends between motor 48 and journal box 50 as shown in Figure 8. The longitudinal paths of travel of the switch actuating arms 21 to 29 inclusive are shown as phantom lines 21' to 29' inclusive of Figure 10.

Inasmuch as in many instances it is desirable that the invention be compact and easily portable, the length of the cam strip Y under such conditions should be as short as possible. The length of the cam strip Y as illustrated in the accompanying drawings is such that but one-half of the processing cycle is completed when the switch supporting body 40 has traversed the length of the cam strip. The structure of switch 39, which is typical of all of the switches 31 to 39, is shown in Figure 12.

When switches 31 to 39 are moved from left to right over the cam strip Y as shown in Figure 10, the raised cam sections 31a to 35a thereon can move the switches 31 to 35 inclusive to the closed position to energize portions of the electric circuit shown in Figure 13. Cam surface 31a is in longitudinal alignment with phantom line 21'. When the raised cam section 21a is contacted by arm 21, the electric circuit to the incandescent bulb X is completed to illuminate the interior of the housing D. Likewise, when raised cam section 32a is contacted by the electric switch actuating lever 32, an electric circuit is completed to energize the motor M shown in Figures 5 and 6 to raise the film holder H upwardly out of one of the receptacles A or B-1 to B-8 inclusive.

Contact of switch actuating levers 23 and 24 with raised cam sections 33a and 34a can result in actuation of the electric motor O to move carriage G either forwardly or rearwardly on the tracks E-1 (Figure 2). When actuating lever 25 engages the raised cam section 35a an electric circuit is completed to an electrically controlled valve A-1 that permits water to flow into the receptacle A through a conduit A-2 communicating with the lower interior portion thereof. In the second half of the processing cycle when the switches 21 to 29 move from right to left over the cam strip Y and the actuating lever 26' contacts a raised cam section 36a to electrically energize the valve A-1, rinse water is permitted to flow through the conduit A-2 into the receptacle A. When levers 27 and 28 contact raised cam sections 37a and 38a they cause the switches 37 and 38 as the case may be, to complete an electric circuit to actuate the motor O whereby the carriage G may travel either forwardly or rearwardly of the rail E-1 shown in Figure 2. In the last half of the processing cycle, the actuating lever 29 upon contacting a raised cam section 39a causes an electric circuit to energize the motor M to raise the spool H upwardly out of one of the receptacles A or B-1 to B-8 inclusive.

The actuating lever 29 on switch 39 (Figure 12) has a roller 29a rotatably supported on the lower end thereof by conventional means, which roller contacts the raised cam section 39a. Structurally, switches 21 to 28 are identical to switch 39 shown in Figure 12. Switches 31 to 39 inclusive are attached by suitable brackets 52 and 54 to the lower portion of a rigid U-shaped member 56 that includes a web 58 to which the body 40 is rigidly affixed. Two legs 60 and 60' extend upwardly from the ends of web 58. Two stub shafts 62 and 62' project outwardly from the arms 60 and 60' and rotatably support two identical wheels 64 and 64' respectively. Wheels 64 and 64' rest on two laterally spaced, elongate members 66 and 66' that project upwardly adjacent to opposite longitudinally extending sides of the support 52.

A switch 70 having an actuating arm 72 is situated adjacent journal box 50, and when the arm is contacted by a portion of web 58 it reverses the current to the motor 48, to change the direction of rotation of shaft 44. When the direction of rotation of shaft 44 is so changed, the body 40 and switches 31 to 39 inclusive are moved toward motor 48 shown in Figure 8. When the body 40 and switches 31 to 39 have traversed the length of the cam strip Y, an actuating lever 74 of a stop switch 76 is contacted by a portion of web 58, whereupon the circuit to the motor 48 is broken and operation of the invention stops. The entire color processing cycle of the film H has been completed by the time operation of the invention is so stopped.

The housing D (Figure 1) includes two identical end walls 80 that project upwardly from the base C, as well as a rearwardly extending side wall 82 and forward side wall 84. The two end walls 80, rearward side wall 82 and forward side wall 84 are relatively shallow in depth. The forward portions of end walls 80 develop into upwardly projecting extensions 86, as best seen in Figure 1. The forward corner portions of extensions 86 are curved. Side wall extensions 86 are connected by a transversely extending continuous wall 88, and a vertical partition 90 extends between these extensions inside the container housing D (Figure 2) to support a horizontal shelf 92 that extends forwardly to the wall 88 and is connected thereto. Partition 90 terminates a short distance below shelf 92. A second partition 94 that is in vertical alignment with partition 90 projects upwardly a short distance above the lowermost portion of end wall 84. The lower edge of partition 90 and the upper edge of partition 94 define an opening 96 therebetween, the purpose of which will hereinafter become apparent.

An opening 98 is formed in the lower forward portion of wall 88, and a door 100 hingedly supported from wall 88 is provided that closes opening 98 when it is not in use. Inwardly extending flanges 102 are formed in the wall 88 adjacent the opening 98, and the peripheral edge portion of an opaque cloth bag 104 is removably connected to flanges 102 by a resilient band 106, or other conventional fastening means. The bag 104 is provided with two forwardly and oppositely disposed extensions 108 and 110 in which openings 108a and 110a are formed. The hands of the user (not shown) may be inserted through openings 108a and 110a into the confines of bag 104 and thereafter moved rearwardly within the confines of housing D to make any adjustment or to carry out any operations on the invention situated therein without exposing the film on the film holder H to the light.

Shelf 92 (Figure 2) serves as a mounting on which the support 52 is disposed. Access to the cam strip Y or other portions of the mechanism shown in Figures 8 and 9 is easily accomplished by raising the forward upper portion 88a of the wall structure, which is pivotally connected to the balance of housing D by a longitudinally extending hinge 112. Housing D includes a second portion D–1 that may be removed therefrom to provide access to the platform E and carriage G supported therefrom, as well as to fill or change the liquid in the receptacles B–1 to B–8 inclusive. The second housing portion D–1 includes two identical end walls 114 that are connected along their upper and rear edges by a continuous wall structure 116, as shown in Figure 1. The upper forward section of wall portion D–1 is provided with locks 118 that are adapted to interlock with lock portions 120 supported on the upper rear portion of wall 88. Likewise, the lower rear portion of housing portion D–1 is provided with locks 122 that are adapted to interlock with lock portions 124 situated on the upper rear portion of side wall 82. When locks 118 and 122 removably engage lock portions 120 and 124 respectively, the second housing portion D–1 cooperates with housing D to provide a unified integral structure that may be carried by a handle 126 located at a convenient position on the upper part of the second housing portion D–1 (Figure 1).

A sheet 128 formed of a suitable rigid material such as plastic, or the like, is disposed within the confines of housing D a substantial distance above the base C, and rigidly connected to end walls and side walls 82 and 84 thereof. A number of openings 130 are formed in sheet 128 that are adapted to slidably and snugly engage the receptacles A–8 and B–1 to B–8 inclusive to hold them in the configuration shown in Figure 3. When disposed in the housing D, the bottoms of receptacles A and B–1 to B–8 rest on the upper surface of base C. The sheet 128 has a number of circumferentially spaced ports 132 formed therein surrounding the opening 130 through which the receptacle A extends downwardly to rest on base C. These ports serve to permit water to flow downwardly therethrough to a drain conduit 134 as best seen in Figures 1 and 2. The water discharging downwardly through ports 132 and out through conduit 134 is the overflow of water from the rinse water receptacle A.

Should it be desired, the conduit 134 can be connected to the suction side of a power driven pump 135. The pump discharges water received from conduit 134 to a desired location such as a sink (not shown) through a conduit 137. By use of the pump 135 and conduit 137 the invention may be disposed on the floor and discharge rinse water into a sink situated at an elevated position thereabove.

A substantially constant temperature is maintained in housing D by circulating air from the ambient atmosphere therethrough. A blower 140 is mounted on the upper portion of partition 90, which is driven by a motor 142. Air is discharged from the blower through an opening 144 formed in partition 90 and thereafter discharge through opening 144 to flow through a labyrinth passage 146 defined by partitions 148, 150 and 152 and escape through an opening 154. The upper ends of partitions 148, 150 and 152 abut against the upper interior surface of the wall 88 and the lower edges of the partitions abut against shelf 92. In Figure 4 it will be seen that the partitions 148, 150 and 152 serve as a light trap to prevent inadvertent exposure of the film as it is being processed.

The film holder H is preferably formed of wire to define a cylindrical portion 154 on which the film 155 or light sensitive paper is mounted in a spiral configuration during the processing thereof. The ends of portion 154 terminate in identical flanges 156 that are preferably formed of spirally wound wire (not shown) to define spirally extending spaces that removably engage the edges of the film or light sensitive paper being processed. A loop 158, as can best be seen in Figure 6, extends upwardly from one of the flanges 156, and is removably engaged by the hook J. An electromagnet 182 is disposed on carriage G, and when electrically energized moves a steel plate 180 upwardly. A flexible beaded member 183 extends downward to hook J, and is of such length as to be taut only when the hook J is supporting the holder H within the confines of one of the receptacles A or B–1 to B–8. When the member 183 is taut, and the electromagnet 182 intermittently energized, the holder H and film 155 will be agitated. However, when the hook J and film holder H are lifted out of the receptacles A or B–1 to B–8, the member 183 is slack, and there is no agitation of the hook and film holder.

The electric circuit to energize electromagnet 182 is intermittently completed by a switch 184 which includes a pivotally movable arm 186, the free end of which at all times is in sliding contact with a wheel 188 wherein a plurality of circumferentially spaced slots 190 are formed. Wheel 188 is continuously driven by an electric motor 192. Arm 186 pivots each time the free end thereof enters one of the slots 190 to complete the circuit to electromagnet 102, and impart agitating movement to plate 180, and hook J with the film holder H supported therefrom. It will be particularly noted that although motor 192 operates continuously, agitation of film holder H only takes place when it is in one of the receptacles A or B–1 to B–8 inclusive.

As can be seen from Figure 2, the platform E which rotates intermittently, supports the carriage G and the motors M, N and O, as well as the light X, and electric current must be supplied to the devices when the platform so rotates. Accordingly, shaft T has a number of insulated commutator rings 202, 204, 206, 208, 210 and 212 mounted thereon. Shaft T is of tubular construction and rotatably supported by a bolt 214 which extends downwardly from a cross piece 216 (Figure 2) that has the ends thereof affixed to walls 114. Bolt 214 is held in place on cross piece 216 by a nut 218, or other fastening means.

The carriage G includes a horizontal platform 164 that is movably supported by two pairs of grooved wheels 166 and 168 that rest on rails E–1. The wheels 166 and 168 are rigidly connected to transversely disposed axles 166a and 168a respectively. Shafts 166a and 168a are journaled in conventional bearing (not shown) affixed to the underside of the platform. Motor O has a driving sprocket 170 that engages an endless link belt 172 which extends to a driven sprocket 174 affixed to a projecting end portion of shaft 166a. The platform 164 as can be seen in Figures 2 and 5 has the motors M, O and 190 mounted thereon by conventional means (not shown), and also supports an inverted L-shaped bracket 176 that supports the electromagnet 192.

The wiring diagram for the invention is shown in detail in Figure 13. Two electrical conductors 214 and 216 are provided that are connected to a source of domestic power (not shown). Conductor 214 extends to contact 218 of a single pole, single throw switch 220, from which a conductor 222 leads to junction point 224. A conductor 226 extends from junction point 224 to junction point 228, and the conductor 216 leads to junction point 230.

A conductor 232 extends from junction point 228 which embodies junctions points 232a, 232b, 232c, 132d and 232e. A conductor 234 extends from junction point 230 and incorporates junction points 234a, 234b and 234c. Conductors 232 and 234 are the source of electrical power for the reversible motor 48 (Figure 8), the blower 142 (Figure 4), and the pump BB used in discharging rinse water that overflows from receptacle A through conduit 134. A first normally open relay 236 is provided that has an actuating coil 238 and three movable armatures 238a, 238b and 238c which are moved to complete electrical circuits through contacts 240a, 240b and 240c respectively when coil 238 is energized.

A second normally closed relay 242 is also provided and includes an actuating coil 244, two armatures 246, 248, and two contacts 246a, 248a. Motor 48 is driven in a direction to move the switches 21 to 29 toward switch 70 when the circuit to the motor is completed from junction points 228 and 230. Junction point 228 is connected by a conductor 232, junction point 232a, conductor 250, armature 246, contact 246a and conductor 252 to one terminal of motor 48. The other terminal of motor 48 is connected by conductor 254, contact 248a, armature 248 and conductor 253 to junction point 234b.

The actuating arm 72 of normally open switch 70, best seen in Figure 11 and also shown in the lower portion of Figure 13, is connected to a conductor 258 that extends from armature 248 to armature 238a. The contact of switch 72 is connected by a conductor 260 that extends to one terminal of actuating coil 238. The other terminal of coil 238 is connected by a conductor 262 to junction point 232b. Momentary closing of switch 70 which occurs after the switches 21 to 29 best seen in Figure 9, have traversed the length of cam strip Y energizes coil 238 of relay 236 to move armatures 238a, 238b and 238c into electrical conducting engagement with contacts 240a, 240b and 240c respectively. A conductor 264 extends from junction point 232c to armature 238b. Likewise, a conductor 266 extends from junction point 232d to armature 238c.

Energization of relay 236 results in concurrent energization of relay 242 to place the latter in the open position. The circuit to energize relay 236 is through conductor 270 that extends from junction point 234a to one terminal thereof and a conductor 268 that extends from the other terminal to contact 240c.

Energization of relay 236 breaks the previously described circuit to motor 48, but a second circuit to the motor is concurrently completed through conductors 272 and 274 that extend from junction points 240a and 240b to junction points 252a and 254a respectively. It will be noted that in the second circuit the direction of current flow to motor 48 is reversed, whereby the motor will rotate in an opposite direction to move the switches 21 to 29 toward the motor. The coil 238 of relay 236 remains energized after the switch 70 assumes an open position due to a conductor 276 that extends from junction point 272a to junction point 278a on conductor 278 which is connected to conductor 260. After the switches 21 to 29 have twice traversed the length of cam strip Y and returned to their initial position, they move a normally closed switch 280 in conductor 232 to the open position.

Opening of switch 280 breaks the circuit to relays 236 and 242. Relay 236 immediately returns to the open position, and relay 242 to the closed position. The blower 142, which is energized by flow of power from junction points 232e and 234c through conductors 282 and 284 respectively, is de-energized. Likewise, the water pump BB that is connected to junction points 232e and 234c by conductors 286 and 288 is de-energized.

Switches 21, 22, 23, 24 and 25 control the operation of light X, winch motor M, forward and rearward movement of carriage G, and the water valve AA respectively, during the movement of the switches over cam strip Y in the first half cycle of the operation. Switches 26, 27, 28 and 29 control the operation of the water valve AA, forward and rearward movement of carriage G, and the winch motor M during the last half cycle of the processing operation as the switches move toward the motor 48. During the last half cycle of the processing operation the opening and closing of the switches 21 to 25 inclusive has no effect on the operation of the light X, winch motor M, or the movement of carriage G. The de-activation of switches 21, 22, 23, 24 and 25 is effected by relays 280, 282, 284, 286 and 288 respectively.

Conductor 278 continues from junction point 278a to junction point 290a on conductor 290. A conductor 292 extends from junction point 290a to one terminal of the actuating coil of relay 280. Conductor 290 has junction points 290b, 290c and 290d, and junction points 290b and 290c have conductors extending therefrom to terminals of the actuating coils of relays 282 and 284 respectively. Conductors extend from junction point 290d to the actuating coils to relays 286 and 288 respectively. A conductor 294 extends from junction point 228 to junction point 296a on conductor 296. Conductors extend from junction points 296a, 296b, 296c and 296d to the actuating coils of relays 280, 282, 284, 286 and 288.

The relays 280, 282, 284, 286 and 288 have armatures 280a, 282a, 284a, 286a, 288a which, when the relays are not energized are in electrical conducting engagement with contacts 280b, 282b, 284b, 286b and 288b respectively. When the relays 280, 282, 284, 286, 288 are energized the armatures move to effect electrical communication with contacts 280c, 282c, 284c, 286c and 288c respectively.

A conductor 298 extends from junction 230 to a spring contact 300 in pressure contact with ring 202. A spring contacts 301 is also in pressure contact with ring 202. Contact 301 is connected to a conductor 302 having junction points 302a, 302b, 302c, 302d, 302e and 302f formed therein. A conductor 304 runs from junction point 302a to one terminal of motor N. One terminal of which motor M is connected to junction point 302c by a conductor 306.

A relay 308 is provided that has two armatures 308a and 308b which are connected by conductors 310a and 310b to the terminals of motor O. When the actuating coil of relay 308 is not energized, armatures 308a and 308b are in electrical conducting engagement with contacts 312a and 312b However, upon energization of relay 308, the armatures move to engage contacts 314a and 314b. Energization of the actuating coil of relay 308 is effected by two conductors 316 and 318 extending from the terminals thereof to junction points 320a and 322a on conductors 320 and 322 respectively. Conductors 320 and 322 are connected to springs 324 and 326 respectively, that are in pressure contact with rings 210 and 212. Contact point 314a is connected by a conductor 328 to junction point 322b. The contact point 312b is connected by conductor 330 to a spring 332 which is in pressure contact with ring 208.

One terminal of motor 192 is connected by a conductor 334 to junction point 302f. The other terminal of motor 192 is connected by a conductor 336 to junction point 322b on conductor 322. The switch arm 186 pivots up and down to engage a contact 186a that is connected by a conductor 338 to solenoid 182. Solenoid 182 is connected by a conductor 340 to junction point 322b on conductor 322. The switch arm 186 is also connected by a conductor 342 to junction point 302f on conductor 302.

A conductor 341 extends from motor M to a spring 342 that is in pressure contact with ring 206. Socket 344 of light X is connected by a conductor 346 to junction point 302b of conductor 302, and by a conductor 348 to a spring 350 that is in pressure contact with ring 204. Armature 280a of relay 280 is connected by a conductor 352 to a spring 354 that is in pressure contact with ring 204. Armature 282a of relay 282 has a conductor 356 extending therefrom to a spring 358 that is in pressure contact with ring 206. A spring 360 is in pressure contact with ring 208, from which spring a conductor 362 extends to armature 284. Likewise, ring 210 has a spring 364 in pressure contact therewith that is connected by a conductor 366 to armature 286a. A spring 368 is in contact with ring 212, and this spring is connected to a conductor 370 that extends to junction point 224. Conductor 370 has junction points 370a, 370b, 370c, 370d, 370e, 370f, 370g from which conductors 372a, 372b, 372c, 372d, 372e, 372f, 372g extend to arms 21, 22, 23, 25, 26, 27 and 29 of switches 31, 32, 33, 35, 36, 37 and 39 respectively.

Contact 21a of switch 31 is connected by a conductor 374 to contact 280b of relay 280. Contacts 22a and 20a are connected by conductors 376 and 378 respectively, to contacts 282b and 282c of relay 282. Also, the contacts 23a and 27a of switches 33 and 37 are connected by conductors 380 and 282 to contacts 286b and 286c of relay 286. A conductor 384 extends from junction point 216a on conductor 216 to a junction point 384a. Two conductors 386 and 388 extend from junction point 384a to arms 24 and 28 respectively, of switches 34 and 38. Contacts 24a and 28a of switches 34 and 38 respectively, are connected by conductors 390 and 392 respectively, to contacts 286b and 286c of relay 286.

A junction point 322d in conductor 322 has a conductor 394 extending therefrom to an arm 396 of a normally open switch 398. When arm 396 is contacted by the frame J as the motor M rotates spool L to lift the frame, the arm is brought into engagement with a contact 400. A conductor 402 extends from contact 400 to contact 404 of the normally closed switch W that is provided with an arm V. Arm V is connected by a conductor 406 to one terminal of motor N. Motor N is driven to rotate platform E when the normally closed switch W is in the closed position. Switch W is placed in the open position when one of the pins U contacts arm V to move the same outwardly.

When lever 412 pivots 411 to the position shown in phantom line in Figure 7 it completes an electric circuit to the motor N (Figure 13) to the extent that the pin U which placed switch W in the open position moves to a location where the switch W is no longer so held. After lever 412 has passed to the right of arm 411 as shown in phantom line in Figure 7, the tensioned spring immediately returns the arm to the vertical position to break the circuit to motor N. When switch 410 so breaks the circuit to motor N, the motor has rotated platform E to a position where the center line E–2 thereof is in vertical alignment with the center of receptacle A and the center of one of the receptacles B–1 to B–8. The film holder H can then be lowered into one of the receptacles B–1 to B–8. When the carriage G moves to the left of the position shown in Figure 5, one of the pins U (Figure 4) moves the arm V to the open position.

As the carriage G moves outwardly on rails E–1 to the position shown in Figure 5 where the film holder H can be lowered into one of the receptacles B–1 to B–8, a normally open electric switch 410 having a pivotally supported actuating arm 411 is placed in the closed position by a lever 412 mounted on the carriage. Switch 410 is provided with a contact 414 that is connected by a conductor 416 to conductor 402, and arm 411 is connected by conductor 418 to conductor 406.

Arm 411 has a pivotally supported extension 411a depending therefrom that can only pivot in a counterclockwise direction. A tensioned spring 420 at all times tends to pivot arm 411 into a vertical position. With the arm 411 vertically disposed, the position of switch 410 is not altered, for the extension 411a simply pivots in a counterclockwise direction without moving the arm 411 from the vertical position.

A description of the operation of the invention follows. The film 420 is mounted on the holder H as shown in Figure 6, and the film holder H is then removably supported from the hook 160 in the position shown in Figure 2. The carriage G is so disposed on track E–1 that the film holder H is positioned over the receptacle B–1. When film holder H is so disposed, the weight thereof will cause the motor M which is not energized to rotate and lower the film holder into the receptacle B–1.

A particular cam strip Y having cam surfaces 31a to 39a inclusive formed thereon that are adapted to cause the invention to perform a certain processing cycle on the film 420, is mounted on the support 52 as shown in Figure 8. By energization of the motor 48 body 40 may be positioned adjacent collar 46, with the switches 21 to 29 inclusive being so disposed as to move over the cam strip Y toward the journal block 50.

When the invention is ready for operation, switch 220 is placed in the closed position with relay 242 being in the closed position and relay 236 in the open position. Electrical energy from the domestic source (not shown) can then pass through conductor 214, switch arm 220, conductor 222, junction 228, conductor 232, switch 280, junction point 232a, conductor 250, relay armature 246, contact 246a, conductor 252, contact 252a, to one terminal of motor 48. Electrical current also flows to motor 48 through conductor 216, junction point 230, conductor 234, and junction points 234a and 234b thereon to conductor 253, armature 248, contact 248a, conductor 254, junction point 254a to the other terminal of motor 48. When so energized motor 48 rotates in a direction to drive the threaded rod 44 in a direction to move body 40 and switches 31 to 39 inclusive toward the journal block 50.

Each time one of the switch arms 21 to 29 inclusive moves over one of the raised cam surfaces 31a to 39a inclusive, the switch arm is pivoted upwardly to be brought into a position to complete an electric circuit. Switches 31 to 39 inclusive are normally open, and are only placed in the closed positions when the switch arms 21 to 29 inclusive encounter one of the raised cam surfaces previously mentioned. After body 40 has moved a certain distance over cam strip Y, the switch arm 22 will encounter a raised cam surface 32a that causes an electric circuit to be completed to winch motor M, The circuit to motor M is completed from junction point 370b on conductor 370 through a conductor 372b, switch arm 22, contact 22a, conductor 376, contact 282b, armature 282a, conductor 356, spring 358, ring 206, spring 339, and conductor 341 that extends to one terminal of motor M. The other terminal of motor M is connected by a conductor 306 to a junction point 302c, conductor 302, spring 301, ring 202, spring 300, conductor 298 to junction point 230.

The hook J is then raised when motor M rotates spool L until an arm J' extending outwardly therefrom is brought into pressure contact with arm 396 of normally open switch 398. This pressure contact places switch 398 in the closed position. One terminal of motor M is connected by conductor 394 to junction point 302a, as may be seen in Figure 13. Closing of switch 398 completes the electric circuit to motor N from junction point 322d through conductor 394, switch arm 396, contact 400, conductor 402, contact 404, switch arm V, and conductor 406. Completion of the circuit to motor N causes the motor to drive a sprocket 422 (best seen in Figure 4) that is connected to an endless chain belt 424 which extends to the driven sprocket S. Motor N will continue to so drive sprocket S until the platform E has rotated to a position where the center line E-2 thereof approaches the center of the next receptacle B-2 into which the film holder H will be lowered. However, before the center of the next receptacle B-2 is reached, one of the pins U that projects upwardly from sprocket S engages the arm V of switch W to place the switch in the open position to break the circuit to the motor N.

Motor M is of a type that has limited lifting power, and after hook J has reached an upward position in which it is stopped by the switch arm 396, the motor will rotate no further, although it continues to be electrically energized. This energization of motor M serves as a brake to prevent downward movement of frame J and holder H. During raising of the holder H and frame J, as well as rotation of the platform E, the body 40 continues to move toward the journal block 50 due to rotation of the threaded shaft 44. Switch 34 is then closed when the arm 24 thereof encounters a raised cam surface 34a. The motor O is now electrically energized and driven in a direction to cause the same to move the carriage G to the right of the position shown in Figure 2.

The electric circuit to motor O (Figure 13) is completed through conductor 222, junction point 224, conductor 370, junction point 370c, conductor 372c, switch arm 23, contact 23a, conductor 380, contact 284b, armature 284a, conductor 362, spring 360, ring 208, spring 332, conductor 330, contact 312b, armature 308b, conductor 310b, to one terminal of motor O. The other terminal of motor O is connected by conductor 310, armature 308a, contact 312a, conductor 315, junction point 302d, conductor 302, spring 301, ring 202, spring 300, conductor 298 to junction point 230. Completion of the circuit to motor O causes carriage G to move to the right (Figure 2) until further movement on the rails E-1 is stopped when the carriage comes into contact with a stop 500 as shown. With the carriage G so positioned, the flexible chain K and spool L are situated directly over the center of receptacle A to permit the film holder H to be lowered therein without contacting the side walls of the receptacle.

After the carriage G is so disposed as to center holder H over receptacle A, the circuit to the motor M is broken by switch 32 to permit the weight of film holder H to rotate motor M in a direction to lower the film holder H into the receptacle. Concurrently with, or just after the film holder H is lowered into receptacle A, the switch 35 is placed in the closed position when the arm 25 comes into contact with a raised cam surface 35a. An electric circuit to the normally closed electrically operated water valve AA is established from junction point 370d through conductor 372d, switch arm 25, contact 25a, conductor 373, contact 288b, armature 288a, and conductor 299 to one terminal of the valve. The other terminal of the valve is connected by a conductor 297 to junction point 298a on conductor 298. Water will continue to be discharged through valve AA and conduit A-1 into receptacle A so long as the switch 35 remains in the closed position.

The electrically driven water pump BB is preferably connected to conductors 297 and 299 at junction points 297a and 299a thereon by conductors 297b and 299b respectively. The pump BB has a greater rate of discharge than the rate at which water flows into receptacle A through valve AA. Valve AA and pump BB are concurrently energized and de-energized.

After the film 420 on holder H has been rinsed in the receptable A for a desired period of time, the switch 32 is again closed ot energize motor M and cause the spool L to raise the frame J and film holder H to a position where the switch 398 is placed in the closed position. Thereafter switch 34 is placed in the closed position to electrically energize the relay 308, which results in movement of armatures 308a and 308b to engage contacts 314a and 314b, with electric current then being supplied to motor O in a reverse direction. The carriage G moves away from stop 500 to a position where it engages stop 502 (Figure 2). As the carriage moves toward stop 502, the switch 410 is momentarily closed by engagement with lever 412 on the carriage, and this momentary closure actuates motor N to the extent that the switch W can assume the closed position. In addition, the platform E is rotated slightly to bring the center line E-2 thereof into true vertical alignment with the center of the next receptacle B-2.

When the film holder H is centered above receptacle B-2, the switch 32 is allowed to assume the open position with the motor M being de-energized. The weight of the film holder H causes the motor M and spool L to rotate in a direction to allow the film holder to be disposed within the confines of the receptacle B-2. As the threaded shaft 44 continues to rotate, the body 40 and the switches 21 to 29 inclusive continue to be moved toward journal block 50 as may be seen in Figure 8, until the switch arm 72 is contacted to place switch 70 in the closed position. Closure of switch 70 energizes coil 238 of relay 236 to bring the armatures 238a, 238b and 238c thereof into engagement with contacts 240a, 240b and 240c respectively. This energization of coil 238 also causes energization of relay 242 to break the circuit previously completed when armatures 246 and 248 are in electrical conducting engagement with contacts 246a and 248a. Energization of relays 236 and 242 effects delivery of current to the motor 48 in a reverse direction, as can be seen in Figure 13, to cause the threaded shaft 44 to rotate in a direction where the body 40 is advanced toward the coupling 46 (Figure 8).

The closing of switch 70 with concurrent energization of the relays 236 and 242 also results in the energization of relays 280, 282, 284, 286, 288. Relays 282, 284, 286 and 288 have armatures 282a, 284a, 286a, 288a that are normally in engagement with contacts 282b, 284b, 286b and 288b. When the relays 282, 284, 286, 288 are not energized, closing of the switches 31, 32, 33, 34 and 35 controls the operation of the light X, winch motor M, and the forward and reverse movement of motor O, as well as the opening of the valve AA. However, as the body 40 moves toward coupling 46, it is desirable and necessary that closing of the switches 22 to 25 inclusive would have no effect upon operation of the light X, winch motor M, motor O, and the water valve AA, for the second half cycle of the processing operation is controlled by the opening and closing of the switches 36 to 39 inclusive.

As relays 282, 284, 286, 288 are energized, the armatures are moved to engage contacts 282c, 284c, 286c, 288c that permit opening and closing of switches 31 to 35 to be carried out by opening and closing of switches 36 to 39 inclusive. The light X is illuminated only during a portion of the first half cycle of the operation, and accordingly when the relay 280 is energized, the armature 280a thereof moves out of engagement with the contact 280b to prevent illumination of the light when the switch 31 is closed during the second half cycle of the processing operation. When the body 40 has returned to a position adjacent the coupling 46, it engages the normally closed switch 280 (Figure 13) and places it in the open position. Opening of switch 280 breaks the circuit to relays 236 and 242 whereby they assume the position initially described, and the invention is de-energized.

The switch 220 that controls the flow of electric power from a domestic outlet is then preferably placed in the open position. The film 420 on holder H has now been subjected to the full processing cycle, and the holder H can accordingly be removed from the hook 160, with the film thereafter being removed from the holder by utilizing the opaque changing bag 104 shown in Figure 2. Although the major portion of the components comprising the invention operate intermittently, the blower 142, and the water pump BB having the discharge thereof connected to the drain line 135 and motor 192, operate continuously due to the wiring hook-up shown in Figure 13.

Although the invention shown and described is fully capable of achieving the objects and providing the advantages hereinbefore mentioned, it is to be understood that it is merely illustrative of the presently preferred embodiment thereof, and that I do not mean to be limited to the details of construction other than as defined in the appended claims.

I claim:

1. In a device for successively placing sensitized photographic film into a plurality of processing means and washing means, said washing means being a first open-mouthed receptacle, said processing means being a plurality of second open-mouthed receptacles circumferentially spaced about said first receptacle that are capable of holding a plurality of film processing chemical solutions, comprising in combination: a film holder on which said film is removably mounted, said holder being of such size as to be insertable in said first and second receptacles; a carriage; horizontal elongate track means on which said carriage can move longitudinally to either a first or second position thereon; means for rotatably supporting said track means above said first and second receptacles, with the center of rotation thereof being in vertical alignment with the vertical center line of said first receptacle; first electrically operated means on said carriage for raising said film holder out of said first and second receptacles when energized and allowing said film holder to move downwardly into said receptacles when de-energized; second electrically operated means for moving said carriage to either said first or second position; third electrically operated means for rotating said track means; a normally open first electrical circuit; a plurality of normally open electric switches forming a part of said first circuit which when closed and opened control said first, second and third means; and power operated means for intermittently closing said plurality of switches in such a time pattern as to cause said first means to be energized to raise said film holder out of the first of said second receptacles to a fixed elevation thereabove when said carriage is in said first position, and for energizing said second means to move said carriage to said second position while maintaining said holder at said elevation, allowing said holder to move downwardly into said first receptacle when in said second position, raising said holder out of said first receptacle to said elevation, moving said carriage to said first position while maintaining said holder at said elevation, rotating said track means to a position relative to the second of said second containers where said holder is lowered enters the confines thereof, and continuing the operation of said fourth means until all of said second receptacles have had said holder lowered thereinto.

2. A device as defined in claim 1 wherein said carriage comprises a horizontal rigid member, two pairs of wheels that engage said track means, two transversely disposed shafts under said rigid member that are journaled thereto and to which shafts said wheels are affixed, with said first means being a first reversible electric motor mounted on said rigid member, which first motor drives a spool having a flexible elongate member capable of being wound on and unwound from said spool and extending downwardly therefrom; and fastening means is provided on the lower end of said flexible member for removably supporting said film holder therefrom.

3. A device as defined in claim 1 wherein said second means comprises a second reversible electric motor mounted on said rigid member, a driving sprocket rotated by said second motor, an endless link belt which engages said driving sprocket, and a driven sprocket affixed to one of said shafts and engaged by said belt.

4. A device as defined in claim 1 wherein said means for rotatably supporting said track means includes a horizontal platform; a vertically disposed shaft affixed to said platform and extending upwardly therefrom, with the center line of said shaft being in coaxial alignment with the center of said first receptacle; a rigid horizontal cross piece that rotatably supports said vertical shaft in a depending position therefrom; means for supporting said cross piece at a fixed elevation above said first and second receptacles; means for rigidly affixing said track means to said platform at a fixed distance therefrom and parallel thereto; said third means is a third electric motor mounted on said platform; and transmission means connect said third motor to said vertical shaft to cause concurrent rotation of said vertical shaft, platform, track means and carriage when said third electric motor is electrically energized.

5. A device as defined in claim 1 wherein said power operated means includes a fourth electric motor, a threaded rod driven by said fourth motor, a second electric circuit that can be closed to continuously drive said fourth motor, a rigid body formed with a tapped bore that threadedly engages said rod, means to support said plurality of normally open electric switches at a fixed position relative to said body, and a cam strip having raised cam surface portions formed thereon, said strip being so disposed relative to said body that as said body is moved thereover portions of said plurality of said switches intermittently contact said raised surface portions to assume said closed positions.

6. A device as defined in claim 5 wherein an incandescent electric lamp is provided that is illuminated during a portion of the processing of said film, which lamp is included as a part of said normally open electric circuit, with a first one of said normally open switches causing said first circuit to be completed to said lamp.

7. A device as defined in claim 5 which includes: an incandescent electric lamp; mounting means to support said lamp on said platform; a plurality of electrical conducting commutator rings; means to support said rings in spaced, electrically insulated, encircling positions on said vertical shaft; a plurality of electrical conducting springs in pressure contact with said rings, which rings comprise a portion of said first circuit; and a first one of said normally open switches that cooperates with portions of said rings and springs to complete a first portion of said first circuit to cause illumination of said lamp during the time said first switch is in contact with first raised surface portions of said cam strip.

8. A device as defined in claim 5 which includes: a plurality of electrical conducting commutator rings; means to support said rings in spaced, electrically insulated, encircling positions on said vertical shaft; a plurality of electrical conducting springs in pressure contact with said rings, said rings comprising a portion of said first circuit; and a second one of said normally open switches that cooperates with portions of said rings and springs to complete a second portion of said first circuit to said first motor to cause the energization thereof during the time said second switch is in contact with second raised surface portions of said cam strip.

9. A device as defined in claim 5 which includes: a plurality of electrical conducting commutator rings; means to support said rings in spaced, electrically insulated, encircling positions on said vertical shaft; a plurality of electrical conducting springs in pressure contact with said rings, which rings comprise a portion of said first circuit; and a third one of said normally open switches that cooperates with portions of said rings and springs to complete a third portion of said first circuit to said second motor to cause the rotation thereof in a direction to move said carriage toward said first position and remain in said first position during the time said third switch is in contact with third raised surface portions of said cam strip.

10. A device as defined in claim 5 which includes: a plurality of electrical conducting commutator rings; means to support said rings in spaced, electrically insulated, encircling positions on said vertical shaft; a plurality of electrical conducting springs in pressure contact with said rings, which rings comprise a portion of said first circuit; a fourth one of said normally open switches that cooperates with portions of said rings and springs to complete a fourth portion of said first circuit to said second motor to cause rotation thereof in a direction to move said carriage toward said second position and remain therein during the time said fourth switch is in contact with third raised surface portions of said cam strip.

11. A device as defined in claim 5 which includes a plurality of electrical conducting commutator rings; means to support said rings in spaced, electrically insulated, encircling positions on said vertical shaft; a plurality of electrical conducting springs in pressure contact with said rings, which rings comprise a portion of said first circuit; a base on which said first and second receptacles rest; a continuous side wall structure that extends upwardly from the periphery of said base; a normally closed electrically operable water valve that occupies a fixed position relative to said base; first conduit means connecting the inlet to said valve to a source of water under pressure; second conduit means connecting the outlet of said valve to the interior of said first receptacle; and a fifth one of said normally open switches that cooperates with portions of said rings and springs to complete a fifth portion of said first circuit to said electrically operable valve to place the same in the open position to discharge film rinse water to said first receptacle during the time said fifth switch is in contact with fifth raised surface portions of said cam strip.

12. A device as defined in claim 5 which includes: a plurality of electrical conducting commutator rings; means to support said rings in spaced, electrically insulated, encircling positions on said vertical shaft; a plurality of electrical conducting springs in pressure contact with said rings, which rings comprise a portion of said first circuit; a base on which said first and second receptacles rest; a continuous side wall structure that extends upwardly from the periphery of said base; a normally closed electrically operable water valve that occupies a fixed position relative to said base; first conduit means connecting the inlet of said valve to a source of water under pressure; second conduit means connecting the outlet of said valve to the interior of said first receptacle; a fifth one of said normally open switches that cooperates with portions of said rings and springs to complete a fifth portion of said first circuit to said electrically operable valve to place the same in the open position to discharge film rinse water to said first receptacle during the time said fifth switch is in contact with fifth raised surface portions of said cam strip; an electrically operated pump having a rate of discharge greater than the rate at which water can discharge into said first receptacle through said second conduit means; a first conduit connected to the suction of said pump and extending to a position adjacent said base to draw up water therefrom that has overflowed from said first receptacle; a second conduit connected to the discharge of said pump and extending out of the confines of said wall structure; and electrical conducting means connecting said pump to said fifth portion of said first circuit to cause energization of said pump concurrently with energization of said electrically operated valve.

13. A device as defined in claim 5 which includes an opaque base that is adapted to hold said first and second receptacles in said spaced relationship, said base having opaque side walls which extend upwardly from the edges thereof, and an opaque cover is provided that is removably attachable to said side walls to define a light-free first confined space wherein said film holder, carriage, first, second and third electrically operable means, and said first, second and third electrical switches are disposed.

14. A device as defined in claim 13 wherein a plurality of opaque partitions are formed in said cover that define a second confined space, and a hinged transparent cover is provided that partially defines said second confined space, with said power operated means being situated within said second confined space.

15. A device as defined in claim 13 wherein a handle is provided for said cover that may be used to carry said device from place to place in an operative condition ready to immediately process said film.

16. In a device for successively placing sensitized photographic film into a plurality of processing means and washing means, said washing means being a first open-mouthed receptacle, said processing means being a plurality of second open-mouthed receptacles circumferentially spaced about said first receptacle that are capable of holding a plurality of film processing chemical solutions, comprising in combination: a film holder on which said film is removably mounted, which holder is of such size as to be insertable in said first and second receptacles; a carriage; horizontal elongate track means on which said carriage can move longitudinally to either a first or second position thereon; means for rotatably supporting said track means above said first and second receptacles, with the center of rotation thereof being in vertical alignment with the vertical center line of said first receptacle; first electrically operable means on said carriage which when energized raises said film holder out of said first and second receptacles and maintains said holder at a fixed elevation thereabove, and when de-energized allows said film holder to move downwardly into said receptacles; second electrically operable means for moving said carriage to either said first or second position; third electrically operable means for rotating said track means; a normally open first electrical circuit; a plurality of normally open electric switches forming a part of said first circuit which when closed and opened control said first, second and third means; cam means having a plurality of raised cam surfaces formed thereon; and power operated means for effecting relative movement between said cam surfaces and the actuating portions of said plurality of switches for intermittently closing said plurality of switches in such a time pattern as to cause said first means to be energized to raise said film holder out of the first of said second receptacles to a fixed elevation thereabove when said carriage is in said first position, and for energizing said second means to move said carriage to said second position while maintaining said holder at said elevation, allowing said holder to move downwardly into said first receptacle when in said second position, raising said holder out of said first receptacle to said elevation, moving said carriage to said first position while maintaining said holder at said elevation, rotating said track means to a position relative to the second of said second containers where said holder is lowered and enters the confines thereof, and continuing the operation of said fourth means until said holder has been lowered into all of said second receptacles.

17. A device as defined in claim 16 wherein said relative movement is in one direction during the first portion of processing said film and in an opposite direction during the balance of the processing of said film.

18. A device as defined in claim 16 which includes a second closed electrical circuit and electrically operable means powered by said second circuit for agitating said film holder when in said first or second receptacles.

19. A device as defined in claim 18 wherein said electrically powered means includes agitation transmission means that transmits said agitation to said film holder only when said film holder is in said first or second receptacles.

References Cited in the file of this patent

Reel E-Z Corporation Circular, Apr. 1, 1957.